(12) United States Patent
Saint-Pierre

(10) Patent No.: US 6,340,876 B1
(45) Date of Patent: Jan. 22, 2002

(54) METHOD FOR DETECTING BATTERY REMOVAL OR ABSENT BATTERY CONDITION IN A CONSTANT CURRENT CHARGER

(75) Inventor: Roland S. Saint-Pierre, Lawrenceville, GA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/664,204

(22) Filed: Sep. 18, 2000

(51) Int. Cl.[7] ................................................ H02J 7/00

(52) U.S. Cl. ................. 320/106; 320/165; 320/DIG. 12

(58) Field of Search ........................ 320/106, DIG. 12, 320/165

(56) References Cited

U.S. PATENT DOCUMENTS

| | | | | |
|---|---|---|---|---|
| 4,745,349 A | * | 5/1988 | Palanisamy et al. | 320/125 |
| 5,291,118 A | * | 3/1994 | Kojima | 320/150 |
| 5,530,337 A | * | 6/1996 | Yamamoto | 320/138 |
| 5,854,551 A | * | 12/1998 | Lilja | 320/163 |
| 5,932,989 A | * | 8/1999 | Thandiwe et al. | 320/106 SS |

* cited by examiner

Primary Examiner—Gregory J. Toatley
(74) Attorney, Agent, or Firm—Dwight N. Holmbo; Wade James Brady, III; Frederick J. Telecky, Jr.

(57) ABSTRACT

A system and method for detecting battery removal or absent battery condition in a charger without use of external stimulus such as a thermistor, EEPROM, or additional pin. The system and method use information solely available from the charger positive and negative terminals to correctly annunciate the current state of the charger to a host or end-user.

20 Claims, 3 Drawing Sheets

METHOD FOR DETECTING BATTERY REMOVAL OR ABSENT BATTERY CONDITION IN A CONSTANT CURRENT CHARGER

BACKGROUND OF THE INVENTION

1. Field of the Invention

This invention relates generally to battery charging systems and methods, and more particularly to a method for detecting battery removal or absent battery conditions for a constant current charger.

2. Description of the Prior Art

Current state of the art commercially available battery charge control IC's do not offer a means to distinguish between an absent battery or battery removal conditions without use of additional external stimulus. Typical solutions qualify battery presence with a thermistor or data input from the battery. U.S. Pat. No. 6,104,303, issued Aug. 15, 2000 to Katada, et al., entitled Battery detecting device for a radio pager, for example, uses a secondary battery and additionally requires a third electrode to sense removal or absence of a primary battery.

In view of the foregoing, a need exists for a means to efficiently detect battery absence or removal from a charging unit without use of external stimulus such as a thermistor, EEPROM, or additional pins (electrodes), and which can be used to correctly annunciate the current state of the charger to a host or end-user.

SUMMARY OF THE INVENTION

The present invention is directed to a technique that provides an efficient means to detect a battery removal from a battery charger, or otherwise distinguish between the condition when a battery is not present in the charger without the use of external stimulus. According to one embodiment, the techniques comprises a circuit having a series of logic gates arranged in a manner to produce a signal (NOBAT), that is indicative of an absent battery or battery removal state. The circuit is applied such that information provided by only the charger positive and negative terminals can be used to correctly annunciate the current state of the charger to a host or end-user. The circuit is implemented as part of a battery charger control integrated circuit (IC) that interrogates the charger output, including the current flowing through the charger to either provide a status signal or otherwise provide an input to a state machine capable of controlling the charger.

In one aspect of the invention, a technique is implemented to detect a battery removal from a charger without use of external stimulus.

In another aspect of the invention, a technique is implemented to distinguish between the condition when a battery is not present in a charger without use of external stimulus.

In yet another aspect of the invention, a technique is implemented to distinguish between the absent battery or battery removal conditions associated with a charger via information provided only by the charger positive and negative terminals.

In still another aspect of the invention, a technique is implemented to correctly annunciate the current state of a charger to a host or end-user without use of external stimulus.

BRIEF DESCRIPTION OF THE DRAWINGS

Other aspects and features of the present invention and many of the attendant advantages of the present invention will be readily appreciated as the same become better understood by reference to the following detailed description when considered in connection with the accompanying drawings in which like reference numerals designate like parts throughout the figures thereof and wherein.

While the above-identified drawing figure sets forth a particular embodiment, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
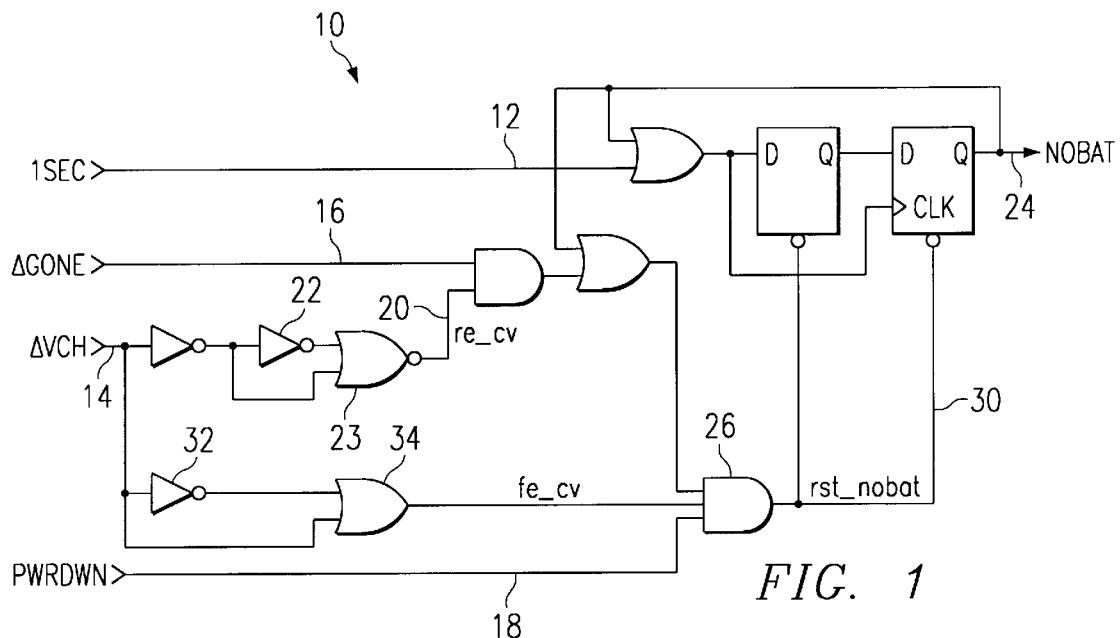
FIG. 1 is a schematic diagram illustrating a circuit for detecting battery removal or absent battery condition in a charger according to one embodiment of the present invention.

FIG. 1 is a schematic diagram illustrating a detection circuit 10 for detecting battery removal or absent battery condition in a charger according to one embodiment of the present invention. A timing signal input 12 provides a 1-second clock to operate the detection circuit 10. The use of a 1-second clock signal is arbitrary, and other clocking signal periods can just as well be utilized to operate the detection circuit 10. A 1-second clock signal is used only for explanatory purposes and to more easily describe the functionality of the detection circuit 10. The ΔVCH signal input 14 is connected to the charger (not shown) output to monitor the charger output voltage signal. The ΔGone signal input 16 is used to monitor the current flowing through the charger. The Pwrdwn signal input 18 is a global controller power down signal that is used by the charger controller IC (not shown) to reset the detection circuit 10 during turn-on. Once connected to a battery charger, and following a Pwrdwn reset, operation of the detection circuit 10 is best explained with reference to FIGS. 2 and 3.

Figure 2:
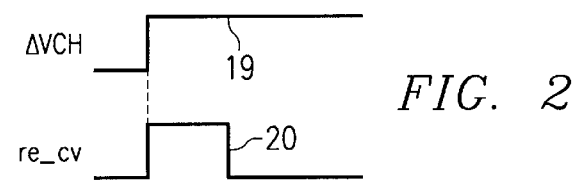
FIG. 2 illustrates representative timing control signals for portions of the circuit shown in FIG. 1.

FIG. 2 illustrates representative timing control signals for portions of the detection circuit 10 shown in FIG. 1. When the ΔVCH signal input 14 receives a trigger pulse ΔVCH 19, a re__cv pulse 20 is produced. The re__cv pulse 20 is most preferably a 20–60 second pulse generated via a resettable 1-shot timer comprising inverter 22 and nor gate 23, where tplh=tphl=60-seconds.

Figure 3:
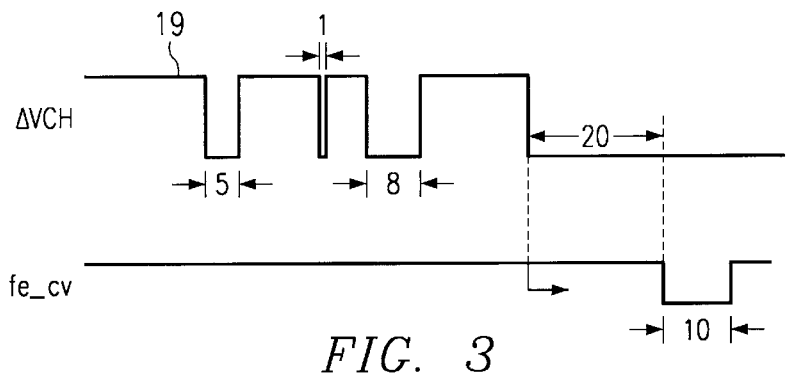
FIG. 3 is a timing diagram depicting operation of the circuit shown in FIG. 1.

FIG. 3 is a timing diagram depicting operation of the detection circuit 10 shown in FIG. 1 when a re__cv pulse 20 is produced. An output signal at NOBAT 24 is produced if a rising edge of ΔVCH 19 is detected; and if, within one minute following the rising edge of ΔVCH 19, a rising edge of a signal received at the ΔGone signal input 16 (charger current falls below a predetermined level, i.e. 10 mA) is latched via combinatorial element 26 to produce a reset signal rst__nobat 30 for a falling edge of ΔVCH 19 that lasts greater than 20-seconds. Other timing sequences can also be formulated in accordance with the present invention; although detection circuit 10 operates as described above since the propagation delay through inverter 32 is established as tplh=tphl=10-seconds, and the propagation delay through combinatorial element 34 is established as tplh=tphl=tilh=tihl=20-seconds. The combinatorial element 34 is shown as an "or" gate in which the inherent propagation and inertial delay is 20-seconds. The present invention is not so limited however, and it shall be understood the other combinatorial elements can just as easily be implemented to provide the requisite functionality according to the principles of the present invention.

Figure 4:
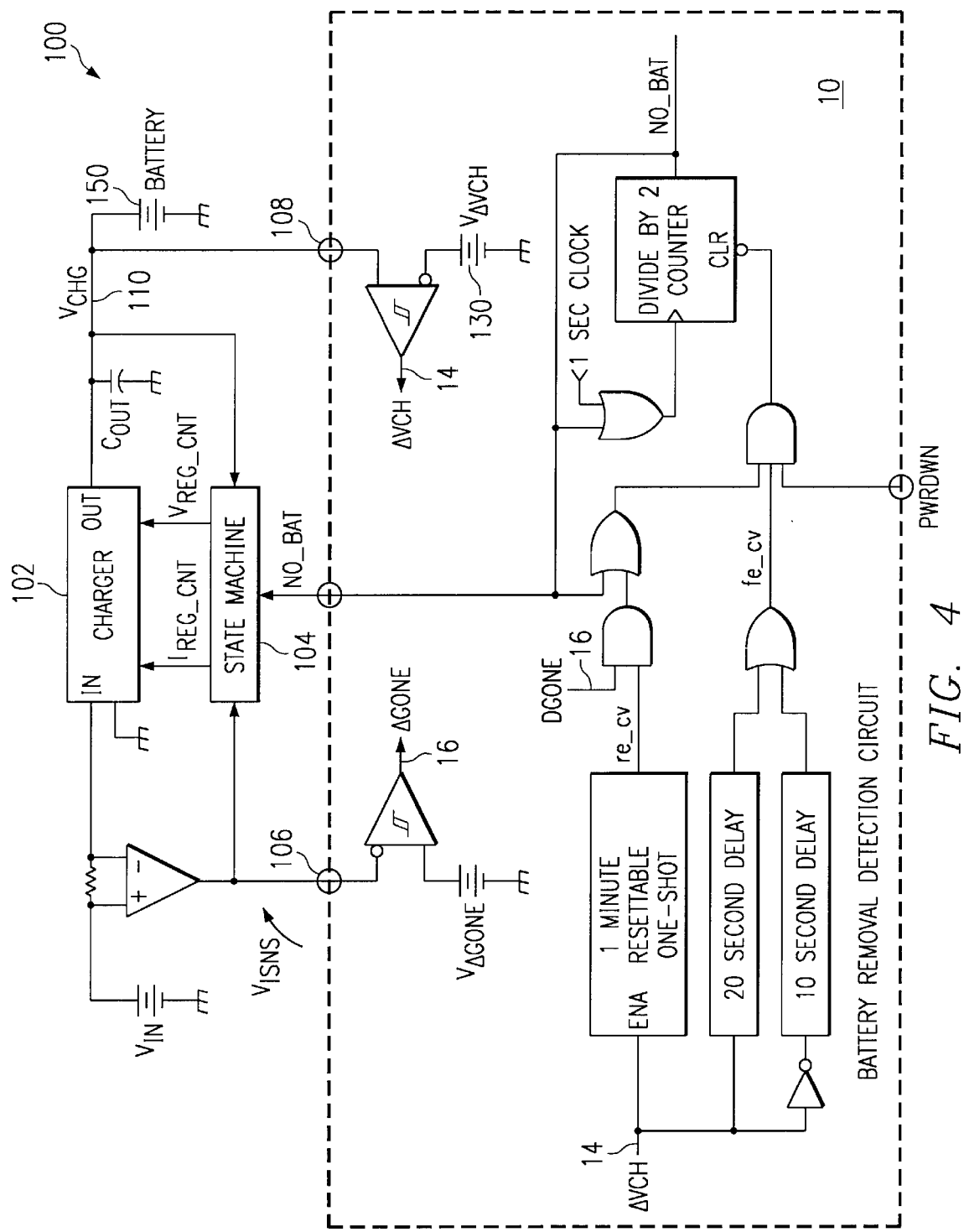
FIG. 4 is a diagram illustrating one embodiment of a charging control system using the battery removal detection circuit shown in FIG. 1.

FIG. 4 is a diagram illustrating one embodiment of a charging control system 100 using the battery removal detection circuit 10 shown in FIG. 1. The charging control system can be seen to include a charger 102 and a state machine charger control unit 104. As stated herein before, the battery removal detection circuit 10 can also be seen to provide a control signal (NOBAT) 24 to the state machine control unit 104 using only two input sensing nodes 106 and 108 to generate ΔGone at input node 16 and ΔVCH 19 at input node 14 respectively.

Figure 5A:
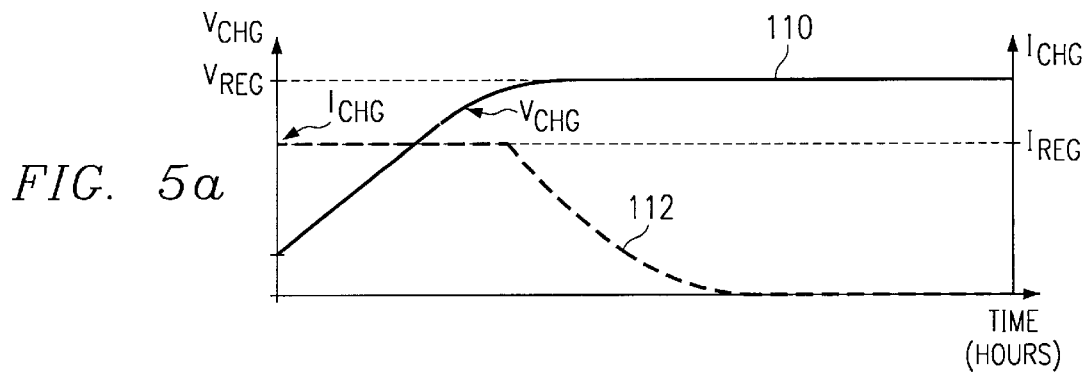
FIGS. 5a and 5b illustrate battery charger voltage and current waveforms during normal charging and during a battery removal for the charging control system shown in FIG. 4.
Figure 5B:
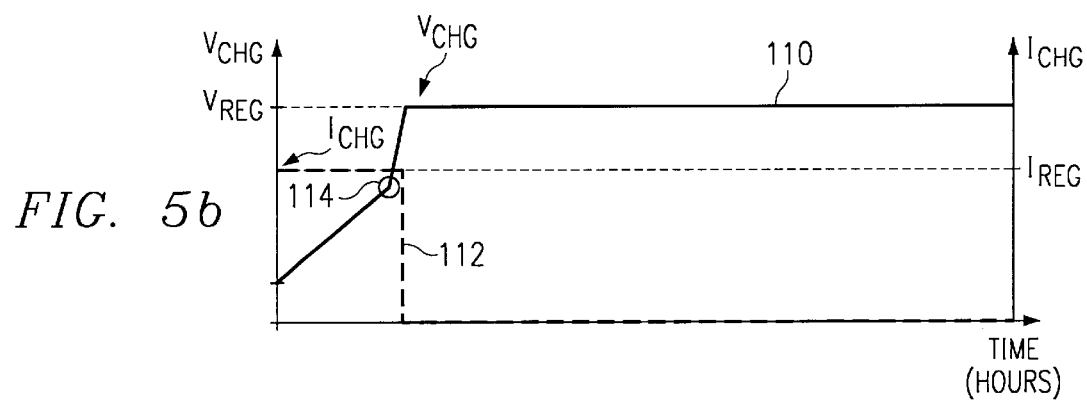

Operation of the charging control system 100 is further explained below with reference to FIGS. 5 and 6 wherein FIG. 5a illustrates battery charger voltage and current waveforms during normal charging and FIG. 5b illustrates charger voltage and current waveforms during a battery removal. As seen in FIG. 5a, when the charging voltage 110 is increasing, the charging current 112 remains steady at a predetermined value until the charging voltage 110 begins to attain a predetermined maximum value. As the charging voltage 110 comes closer to the predetermined maximum value, the charging current 112 begins reduce until charging current 112 is no longer flowing at some predetermined point in time. As seen in FIG. 5b, when the charging voltage 110 is increasing and the battery (enumerated as 150 in FIG. 4) is removed from the system 100 during the charging process (enumerated as 114), the charging voltage 110 very abruptly jumps to its maximum predetermined value. Simultaneously, the charging current 112 drops to zero, since charging current 112 is no longer flowing into the battery 150.

Figure 6:
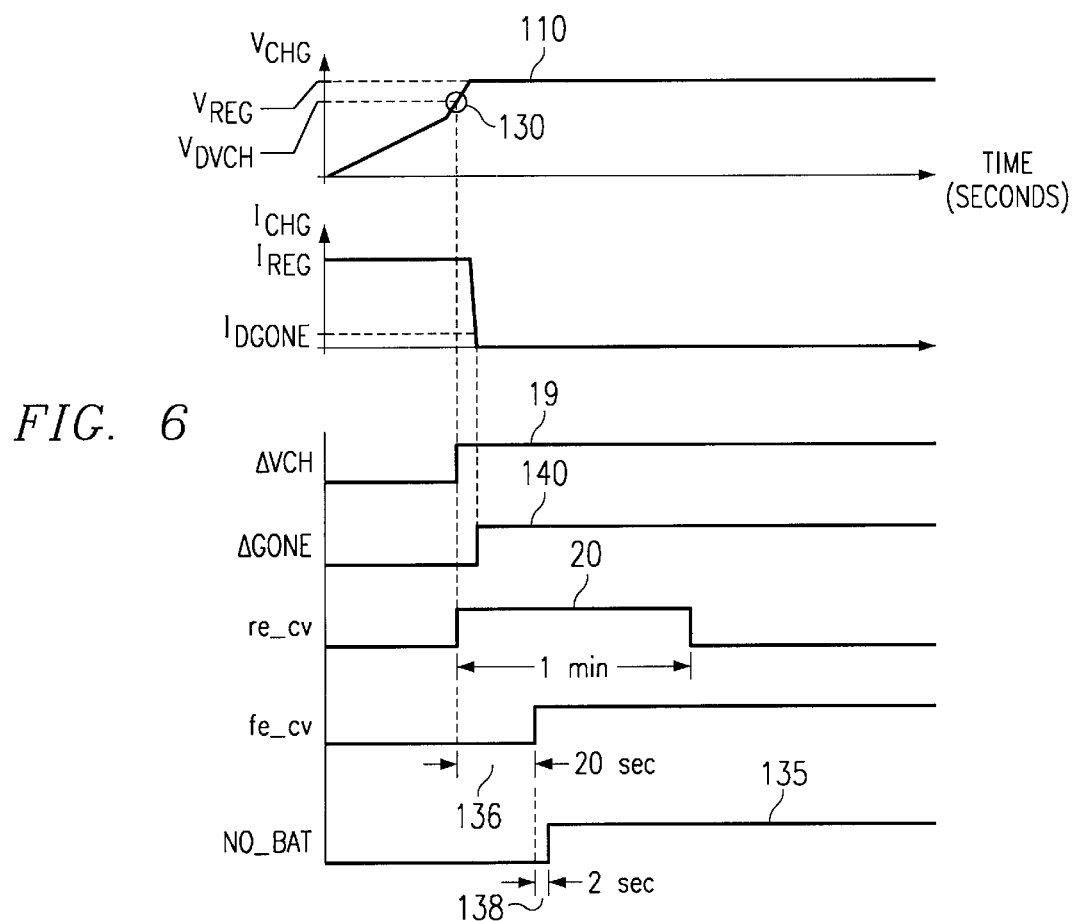
FIG. 6 illustrates timing relationships between various signals for the charging control system shown in FIG. 4 during a battery removal.

FIG. 6 illustrates timing relationships between various signals for the charging control system 100 shown in FIG. 4 during a battery 150 removal. The $re_{13}cv$ pulse 20 transitions high when ΔVCH 19 transitions high ($V_{CHG}$ 110>$V_{\Delta VCH}$ 130). The ΔGone pulse 140 at input node 16 must transition high (indicating the charging current $I_{CHG}$ 112 <10 mA), during the 1-minute re__cv pulse 20. Otherwise, the $NO_{13}$ BAT output signal 135 will not be asserted to a logic 1 state. The timing delay intervals 136, 138 are implemented solely to provide noise immunity for the battery charger detection circuit 10.

In summary explanation of the foregoing, a battery charger detection circuit 10 architecture is implemented in a way that detects battery removal from the charger 102, or distinguishes between the condition when a battery 150 is not present in the charger 102 without using external stimulus such as a thermistor, EEPROM, or an additional pin. The detection circuit 10 requires signal information provided solely by the charger 102 positive and negative terminals to correctly annunciate the current state of the charger 102 to a host or end-user.

In view of the above, it can be seen the present invention presents a significant advancement in the art of battery charger control technology. Further, this invention has been described in considerable detail in order to provide those skilled in the data communication art with the information needed to apply the novel principles and to construct and use such specialized components as are required. In view of the foregoing descriptions, it should further be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow. For example, although various embodiments have been presented herein with reference to particular functional architectures and characteristics, the present inventive structures and characteristics are not necessarily limited to particular detection circuit architectures or sets of characteristics as used herein. It shall be understood the embodiments described herein above can easily be implemented using diverse combinations of combinatorial elements so long as the combinations achieve charger information according to the inventive principles set forth herein above.

What is claimed is:

1. A battery detecting system for a battery charger comprising:

a first combinatorial element having a first input for receiving current flowing through a battery charger, a second input and an output;

a second combinatorial element having a first input connected to the first combinatorial element output, a second input and an output;

a first inverter having an input for detecting a battery charger output voltage and further having an output;

a second inverter having an input connected to the first inverter output and further having an output;

a third combinatorial element having a first input connect to the second inverter output, a second input connected to the first inverter input, and an output connected to the first combinatorial element second input;

a third inverter having an input for detecting a battery charger output voltage and further having an output;

a fourth combinatorial element having a first input connected to the third inverter output, a second input connected to the third inverter input, and an output;

a fifth combinatorial element having a first input connected to the second combinatorial element output, a second input for receiving a global reset signal, a third input connected to the fourth combinatorial element output, and an output;

a sixth combinatorial element having a first input connected to the second combinatorial element second input, a second input for receiving a global clock signal, and an output;

a first flip-flop element having a non-inverting input connected to the sixth combinatorial element output, an inverting input connected to the sixth combinatorial element output, and an output; and a second flip-flop element having a non-inverting input connected to the first flip-flop element output, a clock input connected to the sixth combinatorial element output, an inverting input connected to the sixth com atorial element output, and an output connected to the sixth combinatorial element first input, wherein the battery detecting system is operational to generate an output signal at the second flip-flop element output when a first signal rising edge is received at the first inverter input, and within one minute of receiving the first signal rising edge, a second signal rising edge is latched at the fifth combinatorial element first input subsequent to a falling edge of the first signal in which the first signal is low for a duration of at least 20-seconds.

2. The battery detecting system according to claim 1 wherein the first combinatorial element is an "and" gate.

3. The battery detecting system according to claim 2 wherein the second combinatorial element is an "or" gate.

4. The battery detecting system according to claim 3 wherein the third combinatorial element is a "nor" gate.

5. The battery detecting system according to claim 4 wherein the fourth combinatorial element is an "or" gate.

6. The battery detecting system according to claim 5 wherein the fifth combinatorial element is an "and" gate.

7. The battery detecting system according to claim 6 wherein the sixth combinatorial element is an "or" gate.

8. A battery detecting system for a battery charger comprising:
   a combination of logic gates configured to receive battery charger signals solely from charger positive and negative terminals to produce a "no battery" signal that is indicative of a single battery charger state condition selected from the group consisting of an absent battery state and a battery removal state, wherein the logic gates are operational to generate the "no battery" signal when a rising edge of a battery charger first output voltage signal is received by the logic gates and within one minute of receiving the rising edge of a battery charger first output voltage signal, a rising edge of a battery charger second output voltage signal generated by the charger when the current flowing through the charger drops below a predetermined level, is latched by the logic gates subsequent to a falling edge of the battery charger first output voltage signal in which the first output voltage signal remains low for a predetermined duration of time.

9. The battery detection system according to claim 8 wherein the logic gates are operational to produce the "no battery" signal when the predetermined duration of time is at least 20-seconds.

10. A battery detection system for a battery charger comprising:
    means for receiving a global system clock signal;
    means for receiving a global system reset signal;
    means for receiving a first battery charger signal indicative of battery charger output voltage; and
    means for receiving a second battery charger signal indicative of battery charger current flow,
    wherein the first and second battery charger signals are provided solely by charger positive and negative terminals, and further wherein the battery detection system is responsive to the global system clock signal, the global system reset signal, the first battery charger signal and the second battery charger signal to generate a "no battery" output signal when a state condition associated with a battery charger occurs in which the state condition consists of any one condition selected from the group consisting of "battery removal" and "battery absent."

11. The battery detection system according to claim 10 wherein the "no battery" output signal is generated when a rising edge of the first battery charger signal is received by the means for receiving a first battery charger signal indicative of battery charger output voltage, and within one minute of receiving the rising edge of the first battery charger signal, a rising edge of the second battery charger signal received by the means for receiving a second battery charger signal indicative of battery charger current flow, is latched by the battery detection system subsequent to a falling edge of the first battery charger signal in which the first battery charger signal remains low for a predetermined duration of time.

12. The battery detection system according to claim 10 wherein the means for receiving a global system clock signal comprises an "or" gate.

13. The battery detection system according to claim 12 wherein the means for receiving a global system reset signal comprises an "and" gate.

14. The battery detection system according to claim 13 wherein the means for receiving a first battery charger signal indicative of battery charger output voltage comprises a plurality of inverters.

15. The battery detection system according to claim 14 wherein the means for receiving a second battery charger signal indicative of battery charger current flow comprises and "and" gate.

16. The battery detection system according to claim 10 wherein the "no battery" output signal is generated when a rising edge of the first battery charger signal is received by the means for receiving a first battery charger signal indicative of battery charger output voltage, and within one minute of receiving the rising edge of the first battery charger signal, a rising edge of the second battery charger signal received by the means for receiving a second battery charger signal indicative of battery charger current flow, is latched by the battery detection system subsequent to a falling edge of the first battery charger signal in which the first battery charger signal remains low for at least 20-seconds.

17. The battery detection system according to claim 16 wherein a rising edge of the second battery charger signal is indicative that charging current for a battery charger has dropped below about 10 mA.

18. A method of detecting battery presence in a charging system comprising the steps of:
    monitoring output voltage solely at a predetermined battery charger terminal;
    monitoring current flow solely at a predetermined battery charger terminal; and
    generating a "no battery" output signal when a charging condition associated with the charging system changes state in which a state consists of one condition selected from the group consisting of "battery not present" and "battery removal, wherein the step of generating a "no battery" output signal comprises detecting a rising edge of a signal associated with the output voltage, and within one minute of detecting the rising edge, latching a rising edge of a signal associated with the current flow when a subsequent falling edge of the signal associated with the output voltage is associated with an output voltage signal that remains low for a predetermined period of time.

19. The method of detecting battery presence in a charging system according to claim 18 wherein the predetermined period of time is at least 20-seconds.

20. The method of detecting battery presence in a charging system according to claim 19 wherein the rising edge of the signal associated with the current flow is asserted for a charging system current flow that drops below about 10 mA.

* * * * *